Sept. 21, 1965 P. WELLS 3,207,927

ELECTRIC GATING CIRCUITS

Filed Aug. 28, 1962

INVENTOR

PETER WELLS

BY

Kirchstein, Kirchstein & Ottinger

ATTORNEYS 3,207,927

ELECTRIC GATING CIRCUITS

Peter Wells, Wembley, England, assignor to The General Electric Company Limited, London, England Filed Aug. 28, 1962, Ser. No. 220,023
Claims priority, application Great Britain, Aug. 31, 1961, 31,383/61
14 Claims. (Cl. 307—88.5)

This invention relates to electric gating circuits. Gating circuits in accordance with this invention may be used, for example, as channel gates in a transmitter of a pulse code modulation communication system.

In such a system, equipment at the transmitting terminal operates to sample a plurality of incoming audio frequency signals which it is desired to transmit over the system. The audio frequency signals are sampled in rotation at frequent, regularity recurrent instants by supplying each of the audio frequency signals to a channel gate individual to that signal, and by opening the channel gates in the required rotation, and at the required frequency, selectively to connect the incoming lines, over which the audio frequency signals are being supplied, to a common line in the equipment. The signal appearing on this common line will then be a pulse amplitude modulated signal in which each pulse is a sample of one of the audio frequency signals, the amplitude and polarity of the pulse being the amplitude and polarity, respectively, which the relevant audio frequency signal had at the instant of sampling, that is, that instant that the relevant channel gate was opened.

Amongst the characteristics which it is desirable that each of the channel gates should have is the requirement that the voltage which appears between the input and output of the channel gate when it is open and no signal is applied to it, should be as small as possible. This requirement has not always been satisfactorily met in previously proposed gating circuits and it is, therefore, an object of the present invention to provide a gating circuit in which this requirement is, at least substantially, met.

The term "symmetrical transistor" when used in this specification should be taken to mean a transistor having a base electrode, and two further electrodes, the two further electrodes being distinguishable from one another only by the manner in which they are polarised, so that either of the further electrodes may act as an emitter electrode, the other further electrode then acting as a collector electrode, the characteristics of the transistor being approximately the same whichever of these two arrangements is used.

According to the present invention, an electric gating circuit comprises input and output terminals, a transistor, having a control electrode and first and second further electrodes, the first and second further electrodes being connected to said input and output terminals respectively, and also by way of first and second rectifier means respectively to the two ends respectively of an impedance, and means to apply a signal between the control electrode of the transistor and a tapping on the impedance to provide simultaneously a forward bias between the first further electrode and the control electrode and between the second further electrode and the control electrode of the transistor, and a forward bias across both the first and second rectifier means, so that the gating circuit is then open, and alternatively to provide simultaneously a reverse bias between the first further electrode and the control electrode and between the second further electrode and the control electrode of the transistor, and a reverse bias across both the first and second rectifier means, so that the gating circuit is then closed, the arrangement being such that when the gating circuit is open and no signal is applied between the input and output terminals there is substantially no voltage difference between the input and output terminals.

Preferably said transistor is a symmetrical transistor.

According to a feature of the present invention, an electric gating circuit comprises input and output terminals, two similar transistors, each having a control electrode and first and second further electrodes, the first further electrodes being connected to said input and output terminals respectively, and also by way of first and second rectifier means respectively to the two ends respectively of an impedance, the second further electrodes being connected together, and the control electrodes being connected together, and means to apply a signal between the control electrodes of the transistors and a tapping on the impedance to provide simultaneously a forward bias between each further electrode and its associated control electrode, and a forward bias across both the first and second rectifier means, so that the gating circuit is then open, and alternatively to provide simultaneously a reverse bias between each first further electrode and its associated control electrode, and a reverse bias across both the first and second rectifier means, so that the gating circuit is then closed, the arrangement being such that when the gating circuit is open and no signal is applied between the input and output terminals there is substantially no voltage difference between the input and output terminals.

Two electric gating circuits in accordance with the present invention will now be described by way of example with reference to the accompanying drawing, in which.

Figure 1:
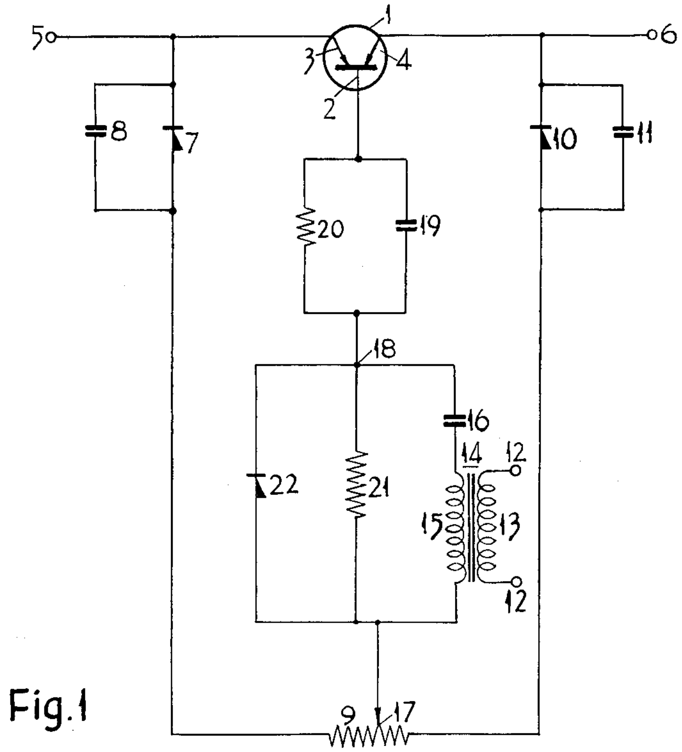
FIGURE 1 shows the first gating circuit.

Referring now to FIGURE 1 of the drawing, the first gating circuit includes a symmetrical transistor 1 having a base electrode 2 and two further electrodes 3 and 4, the further electrode 3 being connected to an input terminal 5 of the gating circuit and the further electrode 4 being connected to an output terminal 6 of the gating circuit. The further electrode 3 is also connected by way of a rectifier element 7 and a capacitor 8 in parallel to one end of a resistor 9, the further electrode 4 being connected by way of a rectifier element 10 and a capacitor 11 in parallel to the other end of the resistor 9.

The gating circuit has a pair of control terminals 12 which are connected to the two ends respectively of the primary winding 13 of a transformer 14, which has a secondary winding 15. The winding 15 is connected in series with a capacitor 16 between a variable tapping point 17 on the resistor 9 and an intermediate point 18. The point 18 is connected to the base electrode 2 of the transistor 1 by way of a capacitor 19 and a resistor 20 in parallel.

Also connected between the tapping point 17 and the point 18 is a resistor 21 and a rectifier element 22 connected in parallel with one another. The rectifier element 22 has its cathode terminal nearer the point 18, while the rectifier elements 7 and 10 have their cathode terminals nearer the further electrodes 3 and 4, respectively, of the transistor 1.

The operation of the gating circuit is then as follows. To open the gating circuit a control pulse of suitable polarity (negative where the base region of the transistor 1 is formed of material of n-type conductivity) is applied between the control terminals 12. This causes the junction between the further electrode 3 and the base electrode 2, and the junction between the further electrode 4 and the base electrode 2 of the transistor 1, and also the rectifier elements 7 and 10, to be biased in the forward direction. The comparatively large current required initially by the transistor 1 to provide the stored charge in the base region is supplied quickly by the capacitor 19. Then, for the remainder of the duration of the control pulse, the base current supplied to the transistor 1 is limited by the resistor 20 to a comparatively small value, but is sufficiently large to keep each of the transistor junctions forward biased in the presence of the maximum expected signal current.

For the duration of the control pulse, therefore, there is a low resistance path between the terminals 5 and 6 by way of the path between the further electrodes 3 and 4 of the transistor 1. Simultaneously two low impedance loops are provided for the switching current, these loops being by way of the rectifier elements 7 and 10 and the resistance 9, the available current dividing between these two loops in dependence upon the position of the tapping point 17 on the resistor 9. To ensure that no voltage appears between the terminals 5 and 6 when the gating circuit is open and no signal is applied to the terminal 5, the available switching current is required to divide between the two loops in the ratio of the current gains between the further electrodes 3 and 4 and the base electrode 2 of the transistor 1.

The gating circuit will remain open for the duration of the control pulse, and during this interval the capacitor 16 charges through the rectifier element 22.

When the control pulse ends there will be a voltage across the resistor 21 due to the discharge of the capacitor 16, this voltage being in the reverse sense to that previously present due to the control pulse. This means that the junction between the further electrode 3 and the base electrode 2, and the junction between the further electrode 4 and the base electrode 2 of the transistor 1, and also the rectifier elements 7 and 10, are biased in the reverse direction. The charge which is stored in the base region of the transistor 1 is rapidly removed by the capacitors 8 and 11. The path between the further electrodes 3 and 4 of the transistor 1 will therefore rapidly assume a high resistance, so that the gating circuit will be closed.

The voltage across the resistor 21 is divided between the rectifier elements 7 and 10 and the junctions of the transistor 1, so it is necessary that the impedances of these elements should be chosen so that each has sufficient reverse bias. In particular, the reverse bias applied to the junctions of the transistor 1 will determine the peak signal voltage which may be applied between the terminals 5 and 6 without the undesired opening of the gating circuit. Also, as the voltage across the resistor 21 is due to the discharge of the capacitor 16, it is necessary to make the time constant long compared with the period for which it is desired that the gating circuit should remain closed.

When the gating circuit is closed some signal current may pass from the input terminal 5 to the output terminal 6 by way of the capacitors 8 and 11, so it is desirable that the values of the capacitors 8 and 11 be made small enough to make their combined reactance very large at signal frequencies.

It is not, in fact, essential for the transistor 1 to be symmetrical, although this is the preferred arrangement. If the transistor 1 is unsymmetrical its want of symmetry is compensated by the positioning of the tapping point 17 on the resistor 9.

Figure 2:
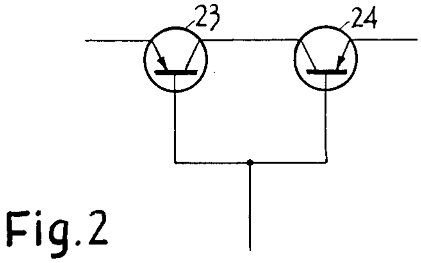
FIGURE 2 shows a part of the second gating circuit.

In the second gating circuit to be described, with reference also to FIGURE 2 of the drawings, the transistor 1 is replaced by a pair of similar junction transistors 23 and 24, each having base, collector and emitter electrodes. The circuit of the second gating circuit is therefore formed by substituting the transistors 23 and 24 of FIGURE 2 for the transistor 1 in FIGURE 1. In the second gating circuit, the base electrodes of the transistors 23 and 24 are connected together and to the capacitor 19 and resistor 20. Similar remaining electrodes of the transistors 23 and 24 are then also connected together, and the two remaining electrodes (which are preferably the emitter electrodes) are connected to the terminals 5 and 6 respectively.

The operation is then similar to that previously described, all four junctions of the transistors 23 and 24 being forward biased when the gating circuit is to be open, and at least the two junctions nearer the terminals 5 and 6 being reverse biased when the gating circuit is to be closed.

I claim:

1. An electric gating circuit comprising a pair of terminals, a transistor having a control electrode and first and second further electrodes, means connecting said first and second further electrodes one to each of said pair of terminals, means connecting said first and second further electrodes to a common point, and means to apply, in response to gating signals applied thereto, control signals between the control electrode and the common point, said last-mentioned means comprising a transformer having a primary winding and a secondary winding, means to apply said gating signals to the primary winding of the transformer, a capacitor, means connecting said capacitor in series with the secondary winding of the transformer between said control electrode and said common point, a rectifier element, and means connecting said rectifier element in parallel with said series-connected capacitor and secondary winding, the circuit being so arranged that when a gating signal is applied to the primary winding of the transformer the capacitor is charged by way of said rectifier element, and a forward bias is applied between the control electrode and the first further electrode and between the control electrode and the second further electrode of the transistor, so that a bi-directional current path is then established between said pair of terminals, while for a period following the cessation of a gating signal the charge on the capacitor provides a reverse bias between the control electrode and the first further electrode and between the control electrode and the second further electrode of the transistor.

2. A circuit in accordance with claim 1 wherein the time constant of the discharge of said capacitor is long compared with the period for which it is desired that the gating circuit should remain closed.

3. In a pulse code modulation communication system, a channel gate formed by a circuit in accordance with claim 1.

4. An electric gating circuit in accordance with claim 1 wherein the transistor is a symmetrical transistor.

5. An electric gating circuit comprising a pair of terminals, a transistor having a control electrode and first and second further electrodes, means connecting said first and second further electrodes one to each of said pair of terminals, first and second rectifier elements, a resistive element having a tapping, means connecting said first and second further electrodes by way of said first and second rectifier elements respectively to the two ends respectively of said resistive elements, and means to apply, in response to gating signals applied thereto, control signals between the control electrode of the transistor and said tapping on the resistive element, said last-mentioned means comprising a transformer having a primary winding and a secondary winding, means to apply said gating signals to the primary winding of the transformer, a capacitor means connecting said capacitor in series with the secondary winding of the transformer between said control electrode and said tapping on the resistive element, a third rectifier element, and means connecting said third rectifier element in parallel with said series-connected capacitor and secondary winding, the circuit being so arranged that when a gating signal is applied to the primary winding of the transformer the capacitor is charged by way of said third rectifier element, and a forward bias is applied between the control electrode and the first further electrode, between the control electrode and the second further electrode and across the first and second rectifier elements, so that a bi-directional current path is then established between said pair of terminals, while for a period following the cessation of a gating signal the charge on the capacitor provides a reverse bias between the control electrode and the first further electrode, the control electrode and the second further electrode and across the first and second rectifier elements, so that said current path is closed.

6. A circuit in accordance with claim 5 wherein each of first and second rectifier elements is by-passed by a capacitor, the combined reactance of these capacitors being very large at the frequency of the signal to be applied between the pair of terminals.

7. An electric gating circuit in accordance with claim 5 wherein the tapping point on the resistive element is selected such that when said gating signal is applied the ratio of the current flow in the loop which includes the first further electrode of the transistor to the current flow in the loop which includes the second further electrode of the transistor is substantially equal to the ratio of the current gain between the first further electrode and the control electrode of the transistor to the current gain between the second further electrode and the control electrode of the transistor.

8. An electric gating circuit in accordance with claim 5 wherein the transistor is a symmetrical transistor

9. An electric gating circuit comprising a pair of terminals, two similar transistors each having a control electrode and first and second further electrodes, means interconnecting the second further electrodes of said transistors, means interconnecting the control electrodes of said transistors, means connecting the first further electrodes of said transistors one to each of said pair of terminals, means connecting the first further electrodes of said transistors to a common point, and means to apply, in response to gating signals applied thereto, control signals between the control electrodes and the common point, said last-mentioned means comprising a transformer having a primary winding and a secondary winding, means to apply said gating signals to the primary winding of the transformer, a capacitor, means connecting said capacitor in series with the secondary winding of the transformer between said control electrodes and said common point, a rectifier element, and means connecting said rectifier element in parallel with said series-connected capacitor and secondary winding, the circuit being so arranged that when a gating signal is applied to the primary winding of the transformer the capacitor is charged by way of said rectifier element, and a forward bias is applied between the control electrode and the first further electrode of each of the transistors, so that a bi-directional current path is then established between said pair of terminals, while for a period following the cessation of a gating signal the charge on the capacitor provides a reverse bias between the control electrode and the first further electrode of each of the transistors.

10. An electric gating circuit in accordance with claim 9 wherein the time constant of discharge of the capacitor is long compared with the period for which it is desired that the gating circuit should remain closed.

11. In a pulse code modulation communication system, a channel gate formed by an electric gating electric in accordance with claim 9.

12. An electric gating circuit comprising a pair of terminals, two similar transistors each having a control electrode and first and second further electrodes, means interconnecting the second further electrodes of said transistors, means interconnecting the control electrodes of said transistors, means connecting the first further electrodes of said transistors one to each of said pair of terminals, first and second rectifier elements, a resistive element having a tapping, means connecting the first further electrodes of said transistors by way of said first and second rectifier elements respectively to the two ends respectively of said resistive element, and means to apply, in response to gating signals applied thereto, control signals between the control electrodes of the transistors and said tapping on the resistive element, said last-mentioned means comprising a transformer having a primary winding and a secondary winding, means to apply said gating signals to the primary winding of the transformer, a capacitor, means connecting said capacitor in series with the secondary winding of the transformer between said control electrodes and said tapping on the resistive element, a third rectifier element, and means connecting said third rectifier element in parallel with said series-connected capacitor and secondary winding, the circuit being so arranged that when a gating signal is applied to the primary winding of the transformer the capacitor is charged by way of said third rectifier element, and a forward bias is applied between the control electrode and the first further electrode of each of the transistors and across the first and second rectifier elements, so that a bi-directional current path is then established between said pair of terminals, while for a period following the cessation of a gating signal the charge on the capacitor provides a reverse bias between the control electrode and the first further electrode of each of the transistors and across the first and second rectifier elements, so that said current path is closed.

13. An electric gating circuit in accordance with claim 12 wherein the tapping point on the resistive element is selected such that when said gating signal is applied the ratio of the current flow in the loop which includes the first further electrode of the first transistor to the current flow in the loop which includes the first further electrode of the second transistor is substantially equal to the ratio of the current gains of the two transistors.

14. An electric gating circuit in accordance with claim 12 wherein a capacitor is provided to by-pass each of the first and second rectifier elements, the combined reactance of said capacitors being very large at the frequency of the signal to be applied between the pair of terminals.

References Cited by the Examiner

UNITED STATES PATENTS

| | | | |
|---|---|---|---|
| 2,862,171 | 11/58 | Freeborn | 307—88.5 X |
| 2,885,570 | 5/59 | Bright et al. | 307—88.5 |
| 2,959,691 | 11/60 | Zoerner et al. | 307—88.5 |
| 3,030,524 | 4/62 | Miller | 307—88.5 |

ARTHUR GAUSS, *Primary Examiner.*